(12) United States Patent
Jeon et al.

(10) Patent No.: US 10,091,893 B2
(45) Date of Patent: Oct. 2, 2018

(54) DISPLAY DEVICE HAVING REDUCED LIGHT LEAKAGE

(71) Applicant: SAMSUNG DISPLAY CO., LTD., Yongin-si, Gyeonggi-do (KR)

(72) Inventors: Young Jun Jeon, Cheonan-si (KR); Hyun Woo Jeong, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/618,769

(22) Filed: Jun. 9, 2017

(65) Prior Publication Data

US 2018/0092224 A1 Mar. 29, 2018

(30) Foreign Application Priority Data

Sep. 27, 2016 (KR) .......................... 10-2016-0124173

(51) Int. Cl.
  *F21V 7/04* (2006.01)
  *H05K 5/00* (2006.01)
  *F21V 8/00* (2006.01)

(52) U.S. Cl.
  CPC ......... *H05K 5/0017* (2013.01); *G02B 6/0088* (2013.01)

(58) Field of Classification Search
  CPC .... G02B 6/0088; G02B 6/009; G02B 6/0091; G02B 6/0093; G02B 6/0095; H05K 5/0017; H05K 5/0091; H05K 5/02; H05K 5/04; H05K 5/06
  See application file for complete search history.

(56) References Cited

U.S. PATENT DOCUMENTS

| | | | |
|---|---|---|---|
| 8,783,930 B2 * | 7/2014 | Park ..................... | G02B 6/0068 349/61 |
| 9,664,949 B2 * | 5/2017 | Ishizuka ........... | G02F 1/133605 |
| 2007/0189011 A1 * | 8/2007 | Song ................. | G02F 1/133603 362/294 |
| 2009/0168405 A1 * | 7/2009 | Yoo ................... | G02F 1/133608 362/97.2 |
| 2011/0199556 A1 * | 8/2011 | Oohira .............. | G02F 1/133308 349/62 |

(Continued)

FOREIGN PATENT DOCUMENTS

| | | |
|---|---|---|
| KR | 10-2000-0026454 | 5/2000 |
| KR | 10-2011-0019823 | 3/2011 |
| KR | 10-2011-0099516 | 9/2011 |

*Primary Examiner* — Ali Alavi

(74) *Attorney, Agent, or Firm* — F. Chau & Associates, LLC

(57) ABSTRACT

A display device includes a bottom chassis, a flange protruding from an edge of the bottom chassis, a supporting frame disposed along a portion of the edge of the bottom chassis, a double-sided adhesive tape having a first adhesive side and a second adhesive side opposite to the first adhesive side, wherein the first adhesive side is adhered to the supporting frame, a display panel disposed on the bottom chassis and adhered to the second adhesive side of the double-sided adhesive tape, and a light source unit configured to provide light to the display panel. The double-sided adhesive tape is adhered to a first portion of the supporting frame and the double-sided adhesive tape is absent from a second portion of the supporting frame. The second portion of the supporting frame is disposed alongside the flange.

20 Claims, 14 Drawing Sheets

(56) References Cited

U.S. PATENT DOCUMENTS

2012/0099053 A1    4/2012  Kamoshida et al.
2013/0208509 A1*  8/2013  Cheng ............... G02F 1/133382
                                                    362/613

* cited by examiner

FIG. 4
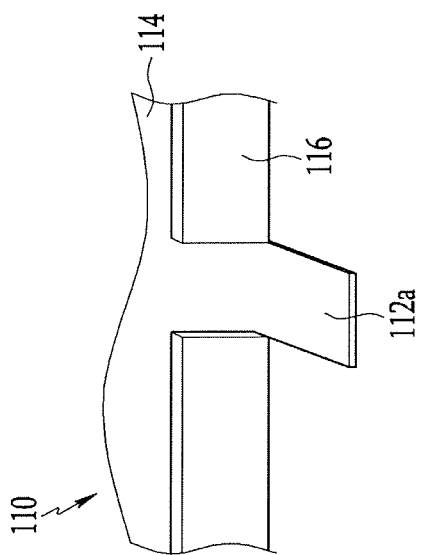
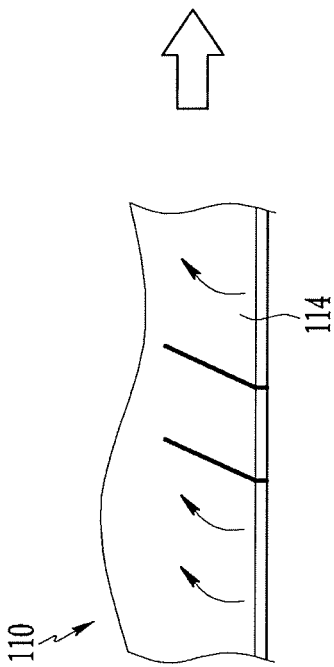

FIG. 5
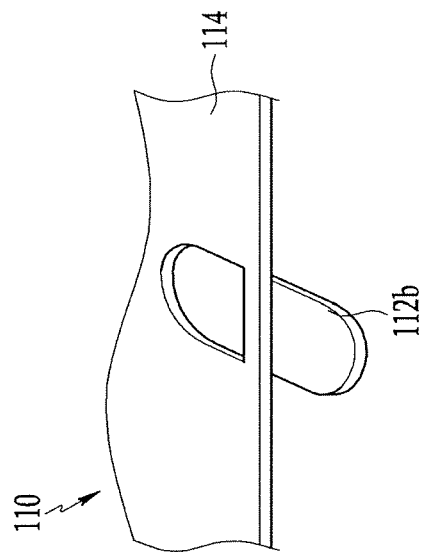
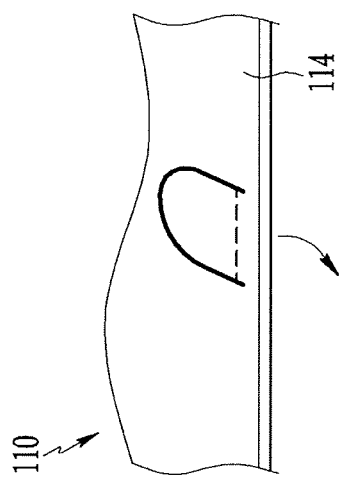

DISPLAY DEVICE HAVING REDUCED LIGHT LEAKAGE

CROSS-REFERENCE TO RELATED APPLICATION

This application claims priority under 35 U.S.C. § 119 to Korean Patent Application No. 10-2016-0124173, filed in the Korean Intellectual Property Office on Sep. 27, 2016, the disclosure of which is incorporated by reference herein in its entirety.

TECHNICAL FIELD

The present invention relates to a display device. More particularly, the present invention relates to a display device having reduced light leakage.

DISCUSSION OF THE RELATED ART

As the demand for display devices has increased, various kinds of display panels used in display devices have been developed. For example, one type of a display panel (e.g. a liquid crystal display (LCD)) can display an image by adjusting the amount and wavelength (e.g., color) of light transmitted from a light source unit. Another type of a display panel (e.g., an organic light emitting diode (OLED) display) can display an image by emitting light of different colors.

With the arrival of a variety of display devices, expectations about the quality of display devices are also increasing. As a demand for thinner display devices is increasing, the thickness of the display panel included in the display device is also decreasing. However, a thin display panel may be susceptible to deformation or damage by an external force.

In addition, the expectations about the quality of the image of the display device are also increasing. In a display device, the accuracy of the color reproduction and the resolution of the display panel are important factors used in determining the quality of the display device. In addition, the reproduction of the color black from a display device that emits light is also an important factor used in determining the quality of the display device. However, interference of light may reduce the accurate reproduction of the color black.

SUMMARY

According to an exemplary embodiment of the present invention, a display device includes a bottom chassis, a flange protruding from an edge of the bottom chassis, a supporting frame disposed along a portion of the edge of the bottom chassis, a double-sided adhesive tape having a first adhesive side and a second adhesive side opposite to the first adhesive side, wherein the first adhesive side is adhered to the supporting frame, a display panel disposed on the bottom chassis and adhered to the second adhesive side of the double-sided adhesive tape, and a light source unit configured to provide light to the display panel. The double-sided adhesive tape is adhered to a first portion of the supporting frame and the double-sided adhesive tape is absent from a second portion of the supporting frame. The second portion of the supporting frame is disposed alongside the flange.

According to an exemplary embodiment of the present invention, a display device includes a bottom chassis including a plurality of flanges, wherein the plurality of flanges extend away from an edge of the bottom chassis, a supporting frame disposed along at least a portion of the edge of the bottom chassis to support the bottom chassis, a double-sided adhesive tape attached to a first portion of the supporting frame, wherein the first portion of the supporting frame extends along the supporting frame, and the first portion of the supporting frame omits areas of the supporting frame that are located alongside each flange of the plurality of flanges, a display panel adhered to the supporting frame by using the double-sided adhesive tape, and a light source unit configured to provide light to the display panel.

According to an exemplary embodiment of the present invention, a display device includes a bottom chassis having a first area, wherein the first area has a first edge, a first flange protruding from the first edge, a supporting frame coupled to the first edge of the bottom chassis, wherein the supporting frame extends along the first edge, and wherein the first flange extends alongside a first area of the supporting frame, a display panel configured to display an image, wherein the display panel is disposed on the first area, a double-sided adhesive tape disposed between the display panel and the supporting frame, wherein the double-sided adhesive tape adheres the display panel to the supporting frame, and a light source unit configured to provide light to the display panel. The double-sided adhesive tape is disposed at a second area the supporting frame. The second area of the supporting frame excludes the first area of the supporting frame.

BRIEF DESCRIPTION OF THE DRAWINGS

The above and other features of the present invention will become more apparent by describing in detail exemplary embodiments thereof in conjunction with the accompanying drawings, in which:

FIG. 4 is a diagram illustrating a process of forming a first flange according to an exemplary embodiment of the present invention;

FIG. 5 is a diagram illustrating a process of forming a second flange according to an exemplary embodiment of the present invention;

DETAILED DESCRIPTION OF THE EMBODIMENTS

Figure 1:
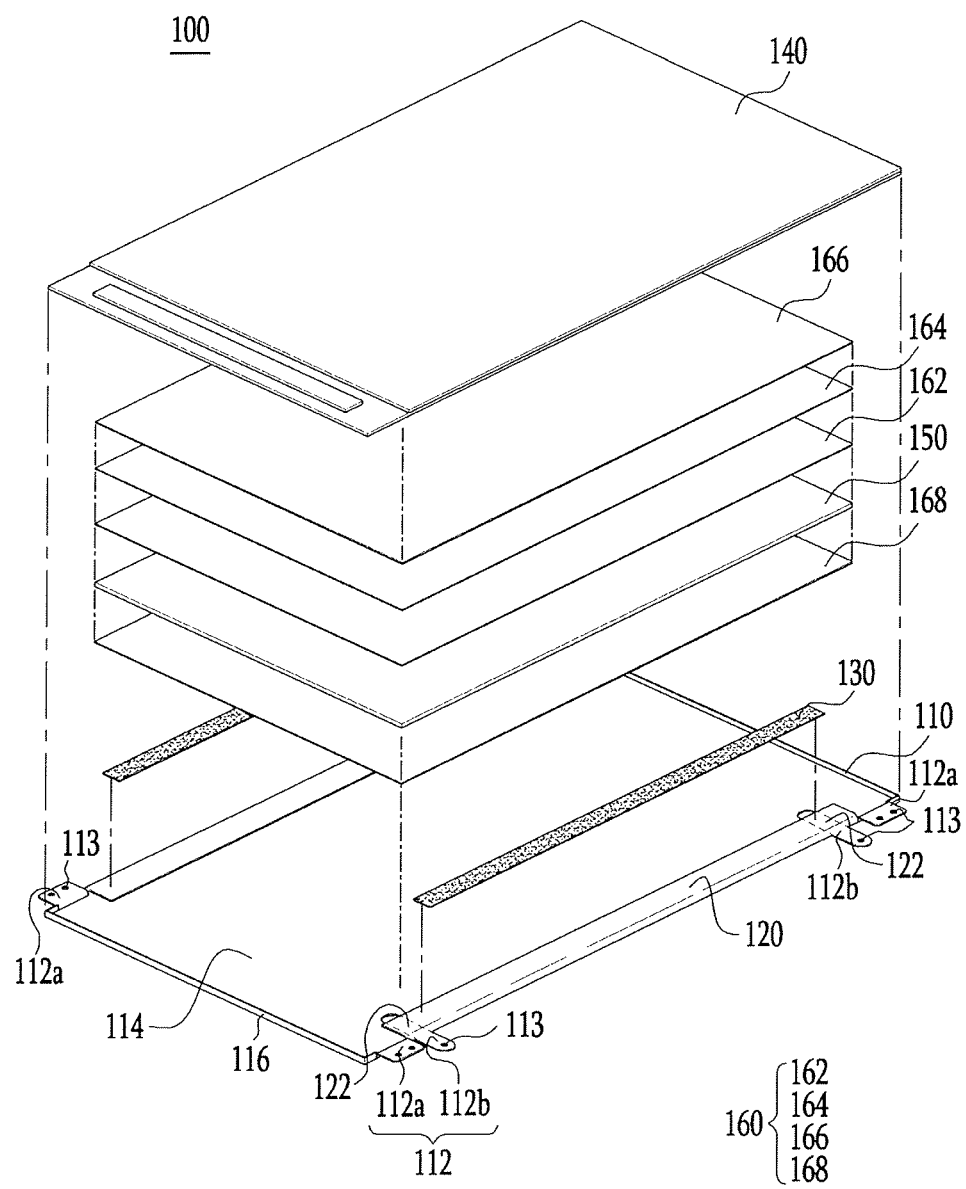
FIG. 1 is an exploded perspective view illustrating a display device according to an exemplary embodiment of the present invention.

Exemplary embodiments of the present invention will be described more fully hereinafter with reference to accompanying drawings. The present invention may, however, be embodied in different forms and should not be construed as limited to the embodiments set forth herein. Like reference numerals may refer to like elements throughout the specification. The sizes or proportions of elements illustrated in the drawings may be exaggerated for clarity.

It will be understood that when an element such as a layer or substrate is referred to as being "on" another element, it can be directly on the other element, or intervening elements may also be present therebetween.

Figure 2:
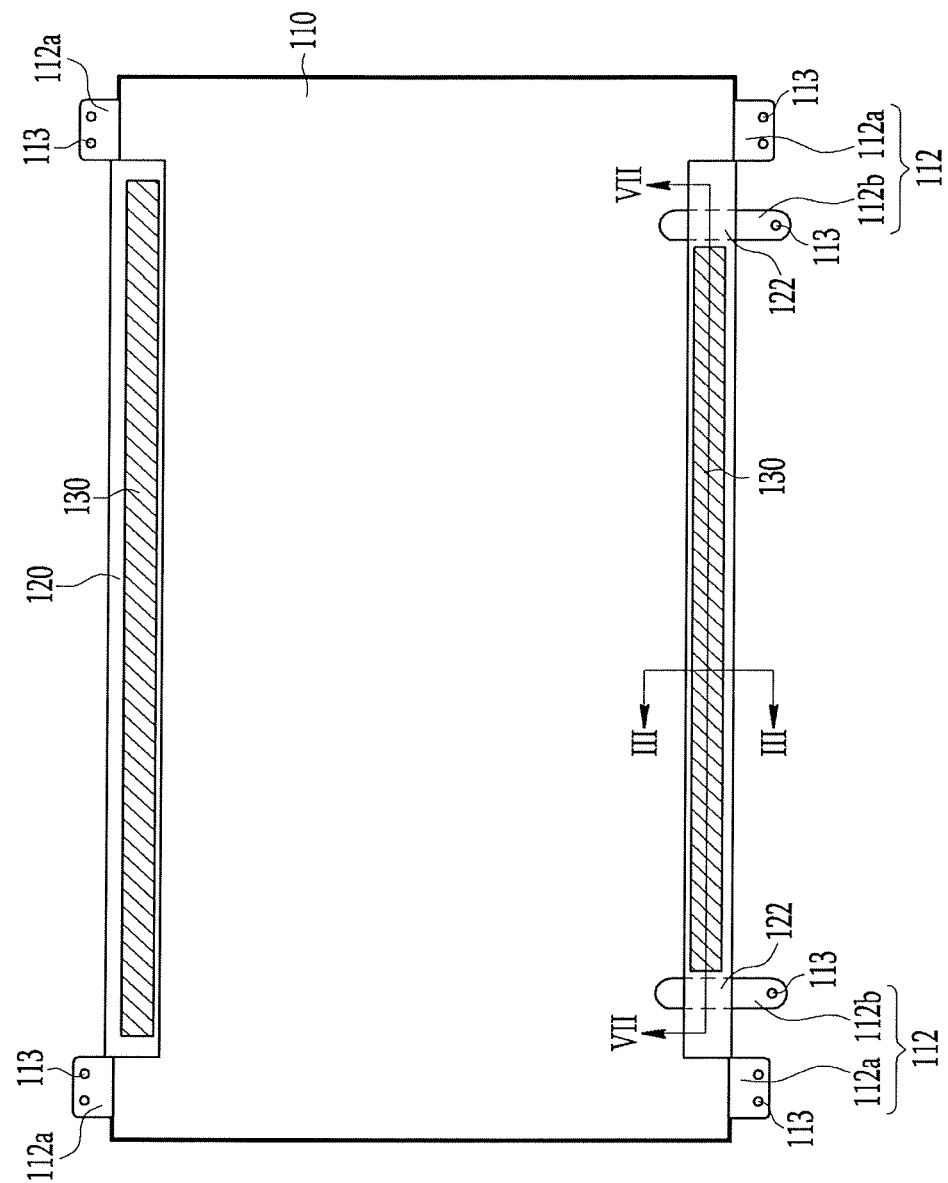
FIG. 2 is a top plan view illustrating a double-sided adhesive tape attached to a supporting frame of FIG. 1, according to an exemplary embodiment of the present invention.
Figure 3:
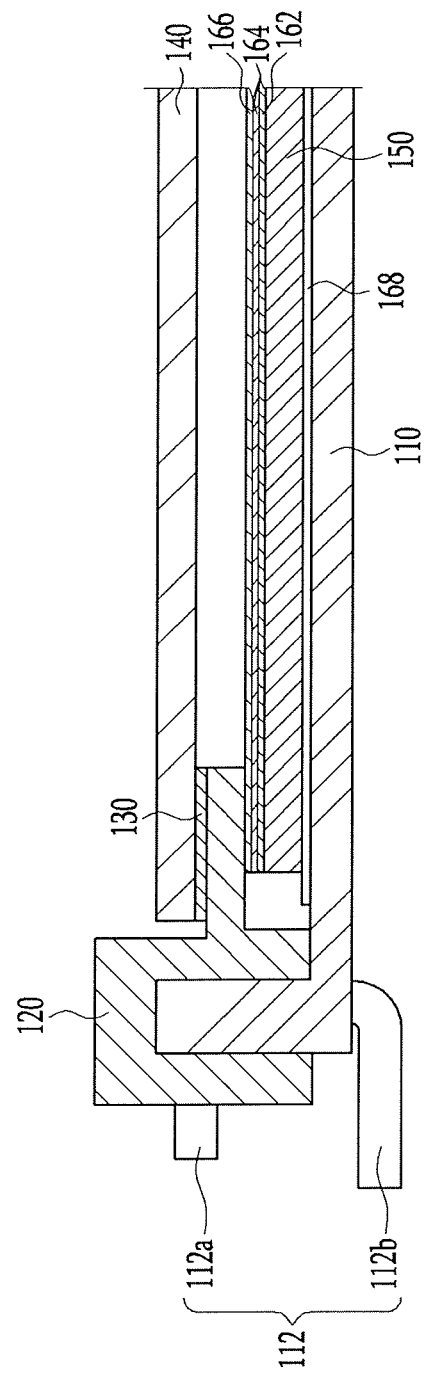
FIG. 3 is a cross-sectional view taken along line of FIG. 2, illustrating a display panel disposed on a bottom chassis, according to an exemplary embodiment of the present invention.

FIG. 1 is an exploded perspective view illustrating a display device according to an exemplary embodiment of the present invention. FIG. 2 is a top plan view illustrating a double-sided adhesive tape attached to a supporting frame of FIG. 1, according to an exemplary embodiment of the present invention. FIG. 3 is a cross-sectional view taken along line of FIG. 2, illustrating a display panel disposed on a bottom chassis 110, according to an exemplary embodiment of the present invention.

As illustrated in FIG. 1, a display device 100 includes a bottom chassis 110, a supporting frame 120, a double-sided adhesive tape 130, and a display panel 140.

The bottom chassis 110 and the supporting frame 120 may be used to support a surface of the display panel 140. The bottom chassis 110 is disposed at a lower portion of the display device 100, and the bottom chassis 110 includes a bottom surface 114 and a side surface 116 that is extended from the bottom surface 114 in a vertical direction. Accordingly, an upper portion of the bottom chassis 110 may be opened, and the upper portion of the bottom chassis 110 may have an accommodating space having a depth that corresponds to the height of the side surfaces 116 in the vertical direction.

As illustrated in FIG. 1, a light guide plate 150 and a plurality of optical sheets 160 may be mounted in a space formed between the bottom surface 114 and the side surfaces 116. The plurality of optical sheets 160 may include a diffusion sheet 162, a prism sheet 164, a protection sheet 166 and a reflection sheet 168. A portion of the bottom surface 114 can be perforated. The perforated portion may overlap the light guide plate 150 and the optical sheets 160 mounted in the bottom chassis 110. The display device 100 may further include a cover disposed in a lower portion of the bottom chassis 110 supporting the lower portion of the bottom chassis 110 and to covering the penetrated bottom surface 114. In addition, the bottom surface 114 may be substantially flat.

The bottom chassis 110 may include a metal material such as aluminum, an aluminum alloy, a galvanized steel plate, or the like. In addition, the bottom chassis 110 may include a polymer material such as polycarbonate, or the like.

The light guide plate 150 and the optical sheets 160 may be mounted in the bottom chassis 110. The light guide plate 150 is configured to guide light emitted from the light source unit toward the display panel 140. For example, the light guide plate 150 may receive a point light beam or a linear light beam from the light source unit and may change the optical path of the received light to direct substantially uniform planar light toward the display panel 140. The optical sheets 160 may include sheets having various optical functions such as a diffusion sheet 162, a prism sheet 164, a protection sheet 166, or a reflection sheet 168. The light source unit may include light sources, for example, light emitting diodes (LEDs), compact fluorescent lamps (CFLs), incandescent lamps, or the like. The light sources may be disposed, for example, in the proximity of a side of the light guide plate 150 (e.g., edge type backlight), or under a surface of the light guide plate 150.

The diffusion sheet 162 diffuses light to scatter the light transmitted from the light guide plate 150 to uniformly distribute the luminance of light, for example, to make a surface light source of uniform brightness. The prism sheet 164 may re-condense the light to be perpendicular to the display panel 140 by adjusting a traveling direction of the light diffused by the diffusion sheet 162. The protection sheet 166 diffuses the light to widen the viewing angle narrowed by the prism sheet 164.

The reflection sheet 168 may be disposed between the light guide plate 150 and the bottom chassis 110. The reflection sheet 168 may increase light efficiency by reflecting light traveling downwardly of the light guide plate 150 and changing the direction to face the display panel 140.

In an exemplary embodiment of the present invention, the optical sheets 160 may include the diffusion sheet 162, the prism sheet 164, the protection sheet 166, and the reflection sheet 168, but the present invention is not limited thereto. For example, the optical sheets 160 might not include one or more of the diffusion sheet 162, the prism sheet 164, the protection sheet 166, and the reflection sheet 168.

In addition, the optical sheets 160 may further include a reflective polarizing sheet to increase luminance efficiency by separating, transmitting, and reflecting polarized light.

In an exemplary embodiment of the present invention, the supporting frame 120 is disposed along a part of an edge of the bottom chassis 110 and supports the bottom chassis 110 to firmly fix the display panel 140 at a predetermined height. Further, as illustrated in FIG. 3, the supporting frame 120 can press and fix the optical sheets 160 and the light guide plate 150 on the bottom chassis 110.

In an exemplary embodiment of the present invention, the supporting frame 120 may include a polymer material such as polycarbonate. When the bottom chassis 110 includes a same material as the support frame 120 (e.g., the same polymer material), the bottom chassis 110 and the support frame 120 can be integrally formed (e.g., the bottom chassis 110 and the support frame 120 may be part of the same structure, or molded as one piece). The supporting frame may, for example, support the bottom chassis 110.

As illustrated in FIG. 2 and FIG. 3, a double-sided adhesive tape 130 is attached to the support frame 120. The double-sided adhesive tape 130 is attached between the support frame 120 and the display panel 140 to couple the display panel 140 with the support frame 120.

The display panel 140 includes a plurality of pixels to display an image. The light source unit may be used to provide the light that the display panel 140 uses to display the image. The display panel 140 may be a liquid crystal display panel or an organic LED display panel. However, the present invention is not limited thereto.

In an exemplary embodiment of the present invention, the bottom chassis 110 has a flange 112 extending from an edge of the bottom chassis 110 and protruding to a side. As illustrated in FIG. 1, in an exemplary embodiment of the present invention, the bottom chassis 110 may include a plurality of sides, and at least one side of the bottom chassis 110 may include a plurality of flanges 112.

In an exemplary embodiment of the present invention, each of the flanges 112 includes a through-hole 113 that passes through the respective flange 112 in the direction that is perpendicular to the bottom surface 114 of the bottom chassis 110. The display device 100 completed can be fixed or fastened by inserting a fixing member or a fastening member through the through-hole 113.

In an exemplary embodiment of the present invention, the flange 112 includes a first flange 112a and a second flange 112b.

FIG. 4 is a diagram illustrating a process of forming a first flange 112a according to an exemplary embodiment of the present invention. FIG. 5 is a diagram illustrating a process of forming a second flange 112b according to an exemplary embodiment of the present invention.

As illustrated in FIG. 4, in an exemplary embodiment of the present invention, the first flange 112a may be formed by bending a portion of the bottom chassis 110. For example, a part of the bottom chassis 110 is cut to include a portion having the shape of the first flange 112a, and then a part of the bottom chassis 110, except for the portion having the shape of the first flange 112a, is bent to be perpendicular to the bottom surface 114. Thus, the first flange 112a may be formed.

Alternatively, the side surface 116 may be formed to be perpendicular to the bottom surface 114 of the bottom chassis 110, and then a portion corresponding to the first flange 112a may be cut and bent. Thus, the first flange 112a may be formed.

As illustrated in FIG. 5, the second flange 112b may be formed by bending a portion of the bottom surface 114 of the bottom chassis 110. For example, the second flange 112b may be formed by cutting a portion of the bottom surface 114 to have a semicircular end, and then rotating the cut portion toward a lower portion of the bottom surface 114.

However, the first flange 112a and the second flange 112b described above and the method of forming them are merely exemplary. In addition, the first flange 112a and the second flange 112b may be exchanged with each other. Alternatively, the first flange 112a and the second flange 112b may be formed by welding and attaching a separate part corresponding to the flange 112 the bottom chassis 110 instead of bending a portion of the bottom chassis 110.

In an exemplary embodiment of the present invention, the bottom chassis 110 including the flange 112 has unevenness formed by the flange 112. The unevenness may include protrusions or depressions aligned in a direction perpendicular to the bottom surface 114 of the bottom chassis 110. For example, the unevenness may be a deviation from a flat state at the bottom surface 114, for example, a wavy, bent, jagged, etc portion of the bottom surface 114 at/near a location of the bottom surface 114 that intersects the flange 112. The unevenness may result from, for example, the forming of the flange 112. The unevenness formed in the bottom chassis 110 may also affect the supporting frame 120 mounted on the bottom chassis 110. Accordingly, the supporting frame 120, which is mounted in the bottom chassis 110 where the unevenness is formed, may also be uneven. For example, the unevenness formed at the bottom chassis 110 may also cause an unevenness on the supporting frame 120 at a location where the supporting frame 120 overlaps the uneven bottom chassis 110 (e.g., near the flanges 112).

Figure 6:
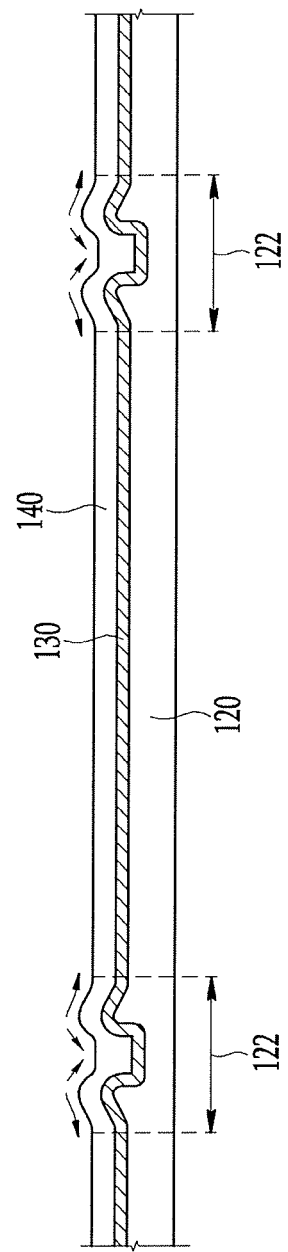
FIG. 6 is a cross-sectional view illustrating a double-sided adhesive tape and a display panel attached onto a supporting frame, the supporting frame having an unevenness, according to an approach.

FIG. 6 is a cross-sectional view illustrating a double-sided adhesive tape and a display panel attached onto a supporting frame, the supporting frame having an unevenness, according to an approach. In FIG. 6, it is illustrated that the double-sided adhesive tape 130 is attached on the overlap portion 122 having the unevenness formed in the supporting frame 120, and the display panel 140 is attached thereon. In the case of FIG. 6, stress concentration occurs in the display panel 140 as shown by the arrows in FIG. 6. Although the thickness of the display panel 140 may be exaggerated in the figure, the actual display panel 140 is very thin. Accordingly, the display panel 140 is sensitive to small external impacts and may be easily damaged.

As illustrated in FIG. 6, when the double-sided adhesive tape 130 is attached on the overlap portion 122 of the support frame 120 to stretch or contract the display panel 140, the display panel 140 also has an unevenness corresponding to the unevenness formed in the supporting frame 120. Therefore, a defect such as a light leakage phenomenon may occur to the display panel 140. In the light leakage phenomenon, a portion of the light supplied from the light source escapes (e.g., leaks) between the uneven portions of the display panel 140.

Figure 7:
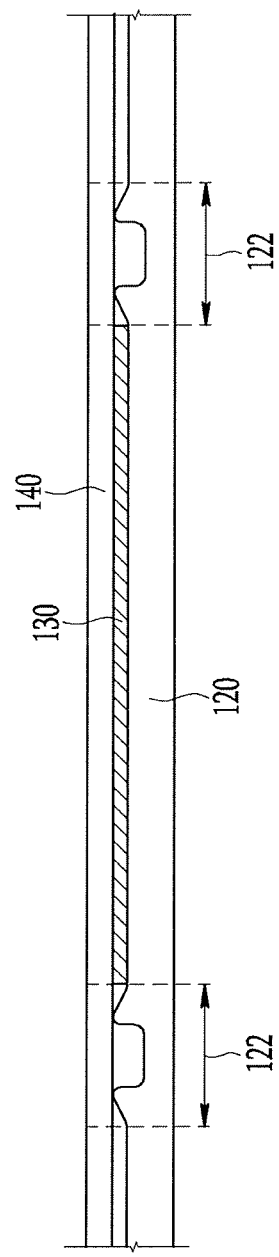
FIG. 7 is a cross-sectional view taken along a line VII-VII of FIG. 2, illustrating a double-sided adhesive tape and a display panel attached onto a supporting frame, the supporting frame being uneven, according to an exemplary embodiment of the present invention.

FIG. 7 is a cross-sectional view taken along a line VII-VII of FIG. 2, illustrating a double-sided adhesive tape 130 and a display panel 140 attached onto a supporting frame, the supporting frame being uneven, according to an exemplary embodiment of the present invention.

In an exemplary embodiment of the present invention, the double-sided adhesive tape 130 is attached to the supporting frame 120 to avoid overlapping the overlap portion 122 of the supporting frame 120 to prevent the light leakage phenomenon described above. For example, in an exemplary embodiment of the present invention, the double-sided adhesive tape 130 is attached to the support frame 120 only between the overlap portions 122. The double-sided adhesive tape may be laid between the two overlap portions 122 but on over the overlap portions 122, according to an exemplary embodiment of the inventive concept.

As illustrated in FIG. 7, since the display panel 140 can move more freely in the overlap portion 122 when the double-sided adhesive tape 130 is not attached to the overlap portion 122, the display panel 140 may be more free to move on the supporting frame 120 when compared with a case where the double-sided adhesive tape 130 is attached to the supporting frame 120 in the overlap portion 122, as in the approach of FIG. 6. When the display panel 140 is more free to move on the supporting frame 120, the stress concentrated by the unevenness can be dispersed in the overlap portion 122. Thus, a breakage of the display panel 140 due to the unevenness can be prevented.

In addition, in an exemplary embodiment of the present invention, the light leakage phenomenon may be prevented without changing a manner of operation of the display panel 140 and without a further process of partially changing an attachment portion of the double-sided adhesive tape 130. Thus, as illustrated in FIG. 7, the portions of the supporting frame 120 in which the double-sided adhesive tape 130 is disposed may be substantially flat (e.g., even).

Figure 8:
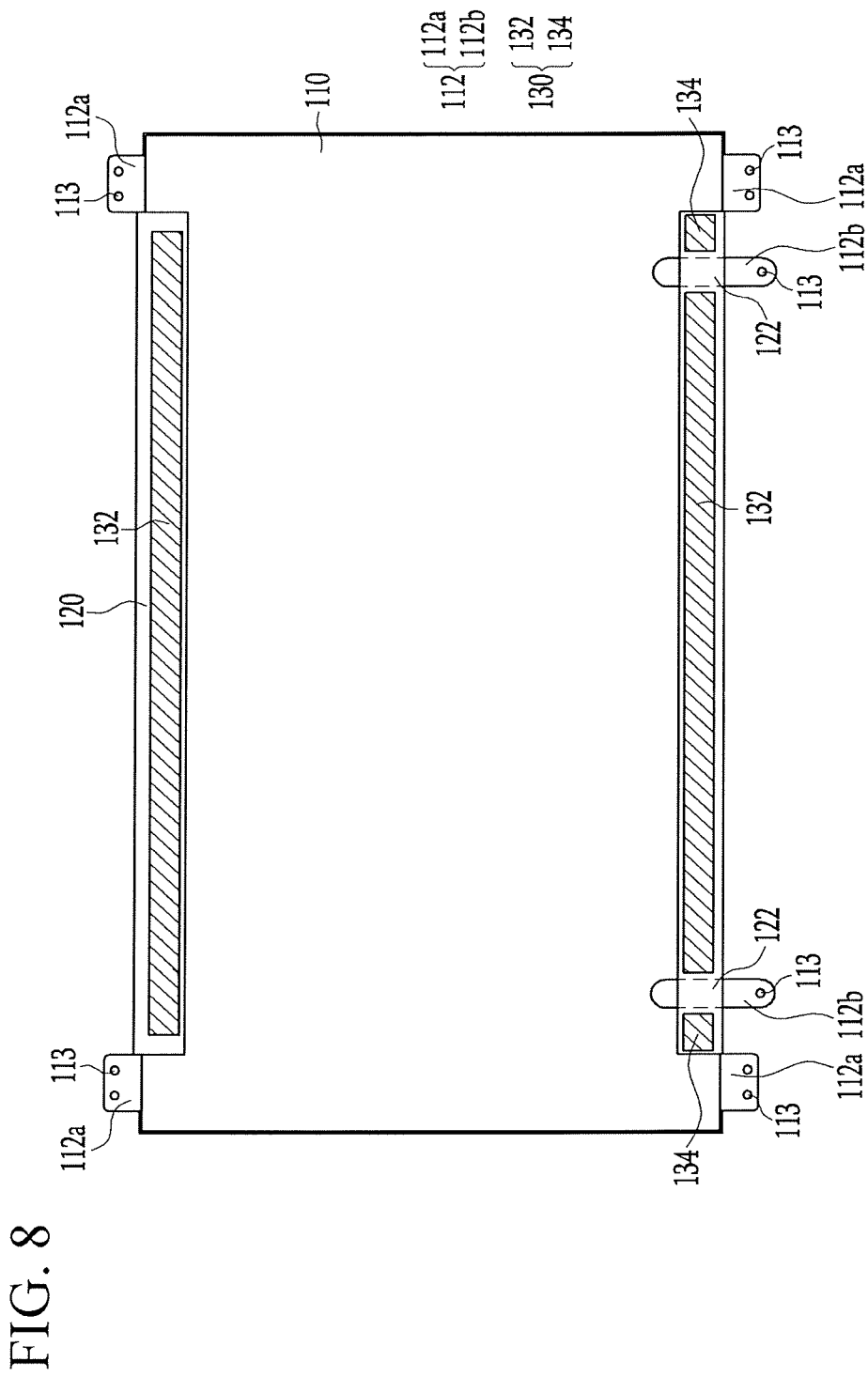
FIG. 8 is a top plan view illustrating a double-sided adhesive tape including a first attachment portion and a second attachment portion according to an exemplary embodiment of the present invention.

FIG. 8 is a top plan view illustrating the double-sided adhesive tape 130 including a first attachment portion 132 and a second attachment portion 134 according to an exemplary embodiment of the present invention. In FIG. 8, a first side of the quadrangular bottom chassis 110 includes a pair of first flanges 112a and a pair of second flanges 112b, and a second side of the quadrangular bottom chassis 110 includes only a pair of first flanges 112a.

In this case, as illustrated in FIG. 8, the second flange 112b formed on the first side of the quadrangular bottom chassis 110 may be disposed closer to the center of the support frame 120 than the first flange 112a. Alternatively, the first flange 112a may be disposed closer to the center of the frame than the second flange 112b.

The first attachment portion 132 of the double-sided adhesive tape 130 is attached to a portion of the supporting frame 120 in an area between the pair of first flanges 112a. In this case, as illustrated in FIG. 8, the first attachment portion 132 is attached on the second side between the pair of first flanges 112a, and only between the second flanges 112b on the first side.

In addition, as illustrated in FIG. 8, the second attachment portion 134 of the double-sided adhesive tape 130 is attached to a portion of the support frame 120 in an area between the first flange 112a and the second flange 112b. Therefore, in an exemplary embodiment of the present invention, the double-sided adhesive tape 130 is attached to a portion of the support frame 120 other than the overlap portion 122.

Figure 9:
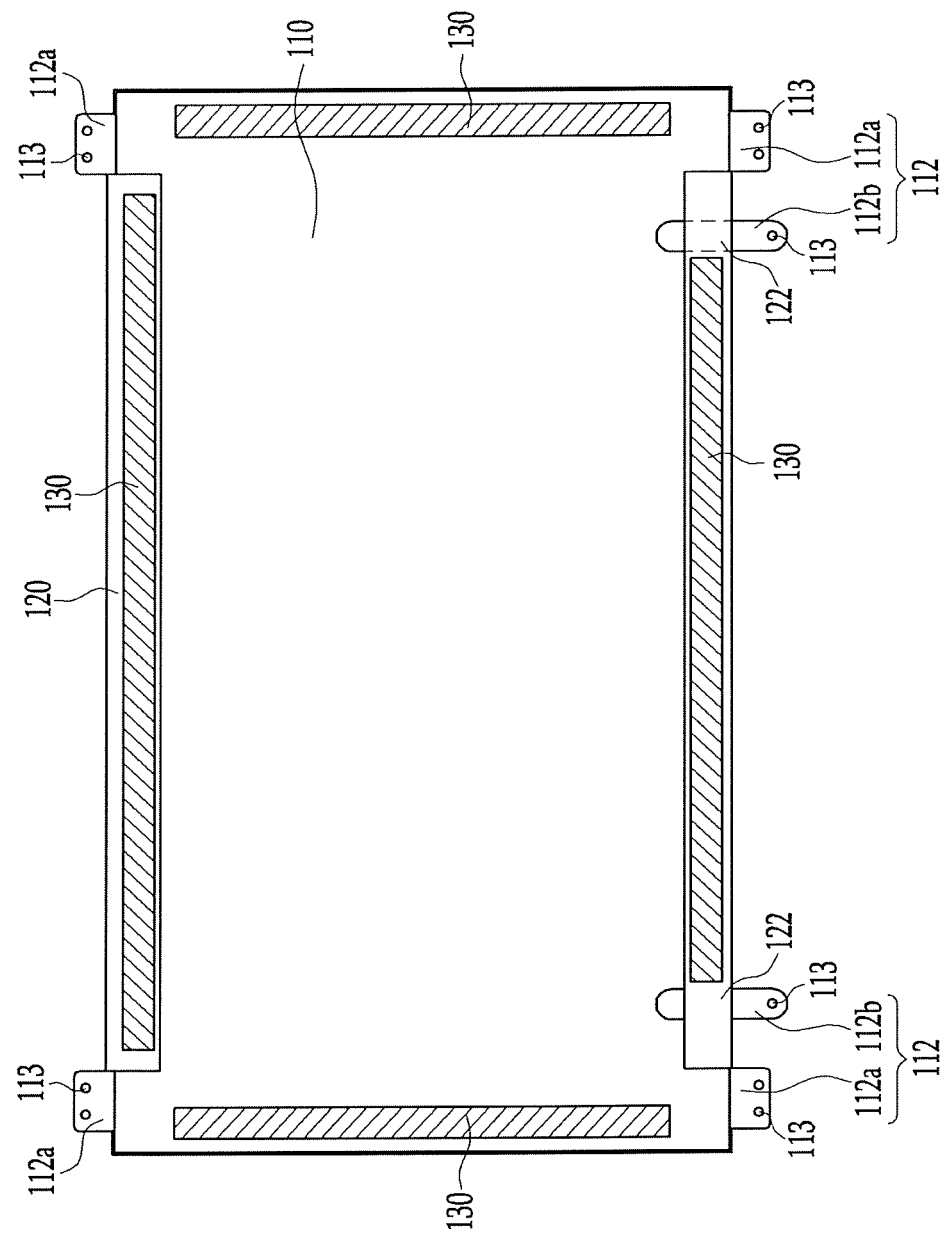
FIG. 9 is a top plan view illustrating the display device of FIG. 2, according to an exemplary embodiment of the present invention.
Figure 10:
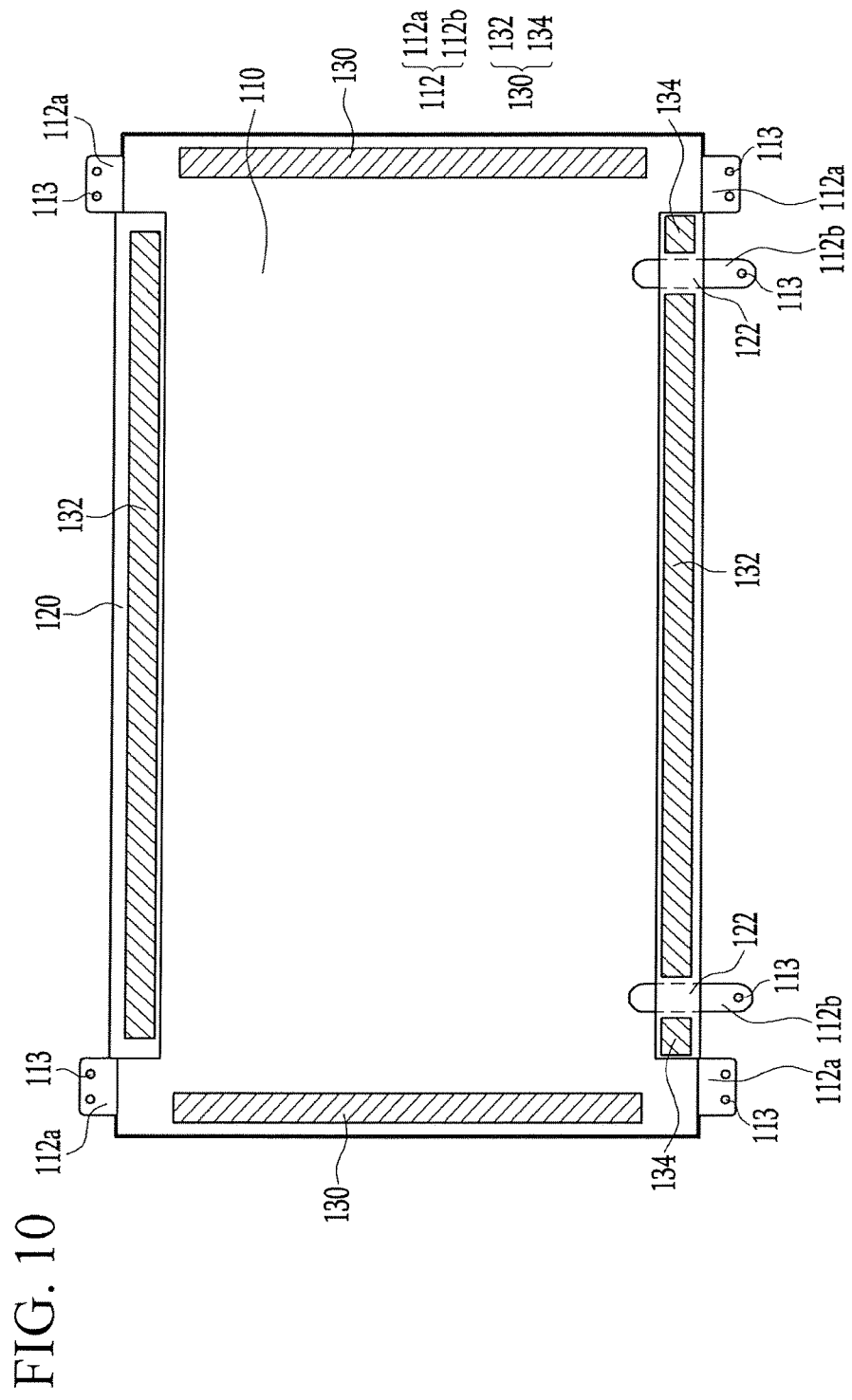
FIG. 10 is a top plan view illustrating the display device of FIG. 2, according to an exemplary embodiment of the present invention.

FIG. 9 is a top plan view illustrating the display device of FIG. 2, according to an exemplary embodiment of the present invention. FIG. 10 is a top plan view illustrating the display device of FIG. 2, according to an exemplary embodiment of the present invention.

As illustrated in FIG. 9 and FIG. 10, in the quadrangular bottom chassis 110, the double-sided adhesive tape 130 may be attached to the support frame 120 in an area corresponding to a pair of sides other than the pair of sides where the flange 112 is formed. In this case, the pair of sides in which the flange 112 is not formed may be defined as lateral sides. As illustrated in FIG. 9 and FIG. 10, the double-sided adhesive tape 130 may be attached to at least a part of the pair of lateral sides.

In FIG. 9 and FIG. 10, it is illustrated that the double-sided adhesive tape 130 is attached only to a part of the pair of lateral sides on which the flange 112 is not formed, but the present invention is not limited thereto. For example, the double-sided adhesive tape 130 may be attached to the entire span of the pair of lateral sides except for on the flanges 112.

In addition, or alternatively, the double-sided adhesive tape 130 may be attached in a dashed line shape (e.g., with interruptions) instead of being attached in a linear shape, except for on the flanges 112.

Figure 11:
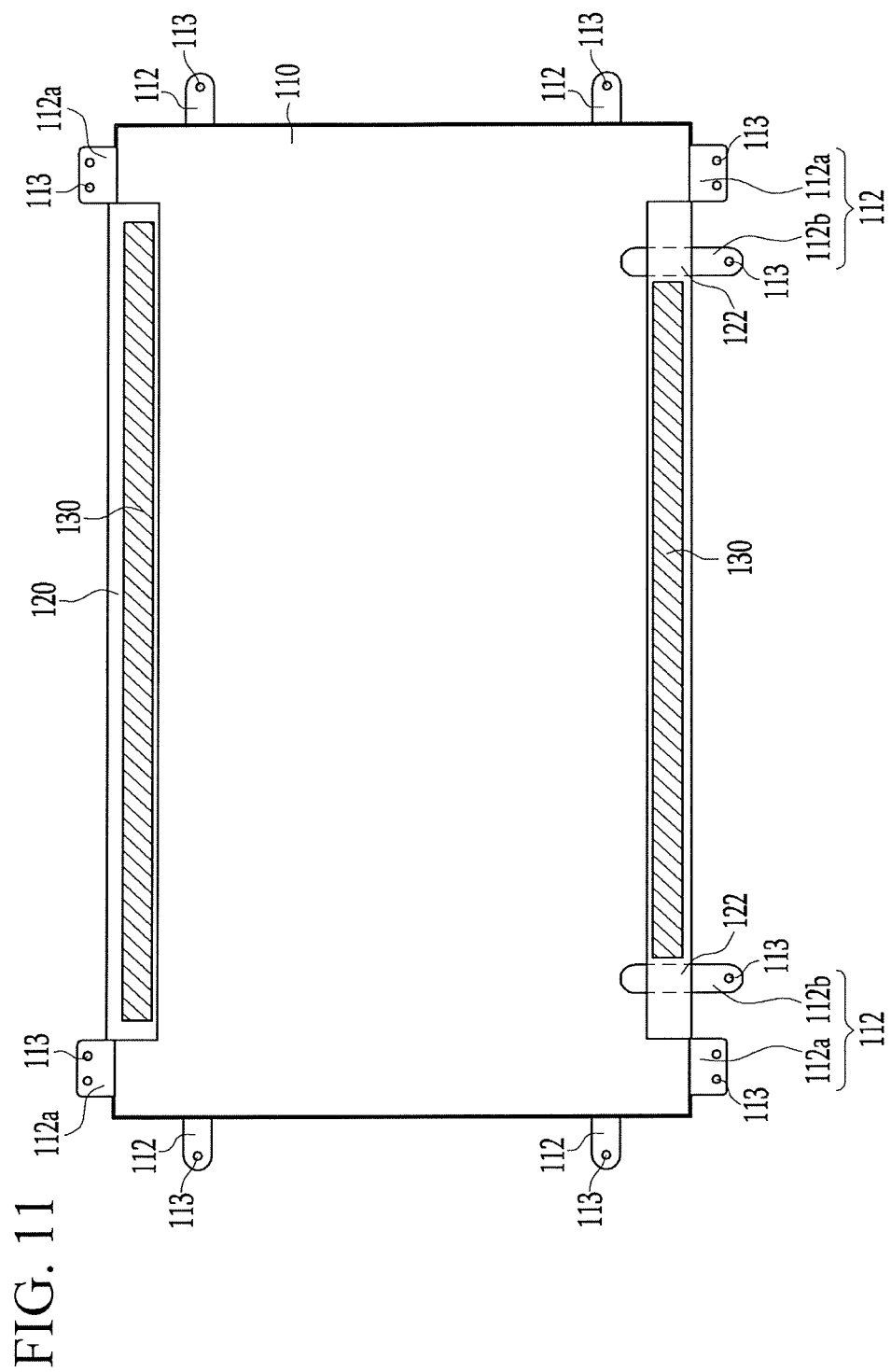
FIG. 11 is a top plan view illustrating a double-sided adhesive tape attached to a supporting frame of a display device, according to an exemplary embodiment of the present invention.
Figure 12:
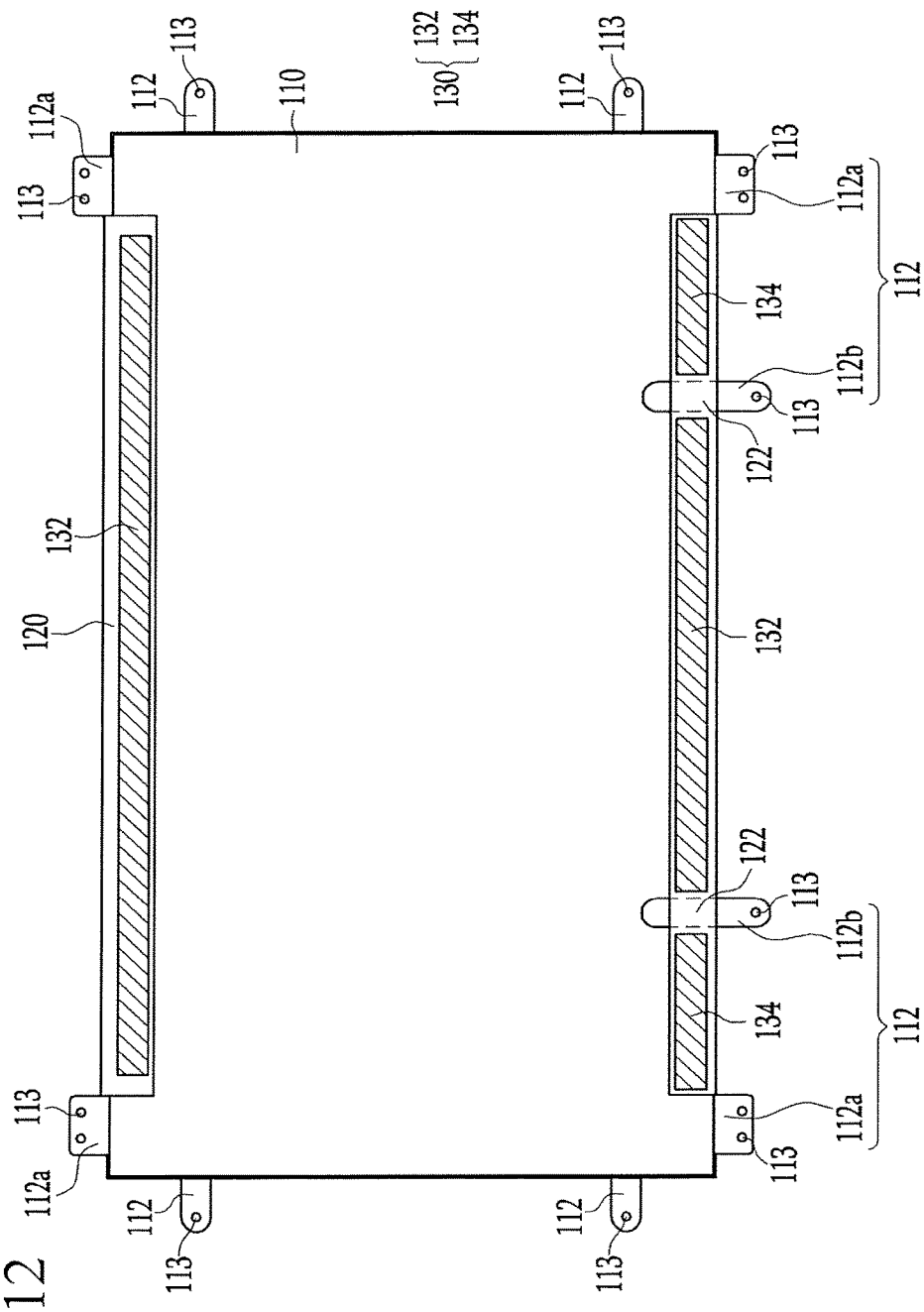
FIG. 12 is a top plan view illustrating a double-sided adhesive tape attached to a supporting frame of the display device of FIG. 11, according to an exemplary embodiment of the present invention.
Figure 13:
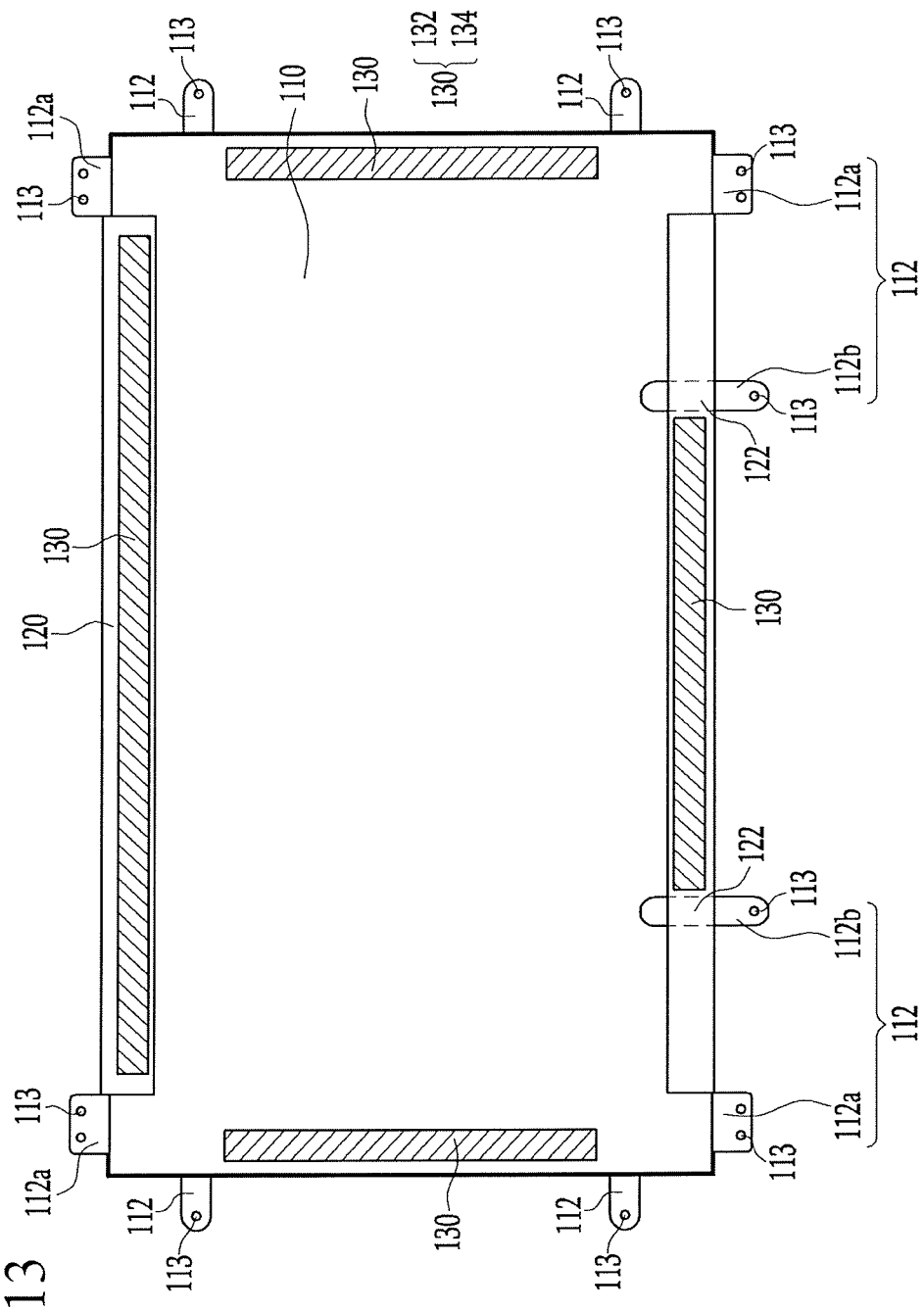
FIG. 13 is a top plan view illustrating a double-sided adhesive tape attached to a supporting frame of the display device of FIG. 11, according to an exemplary embodiment of the present invention.
Figure 14:
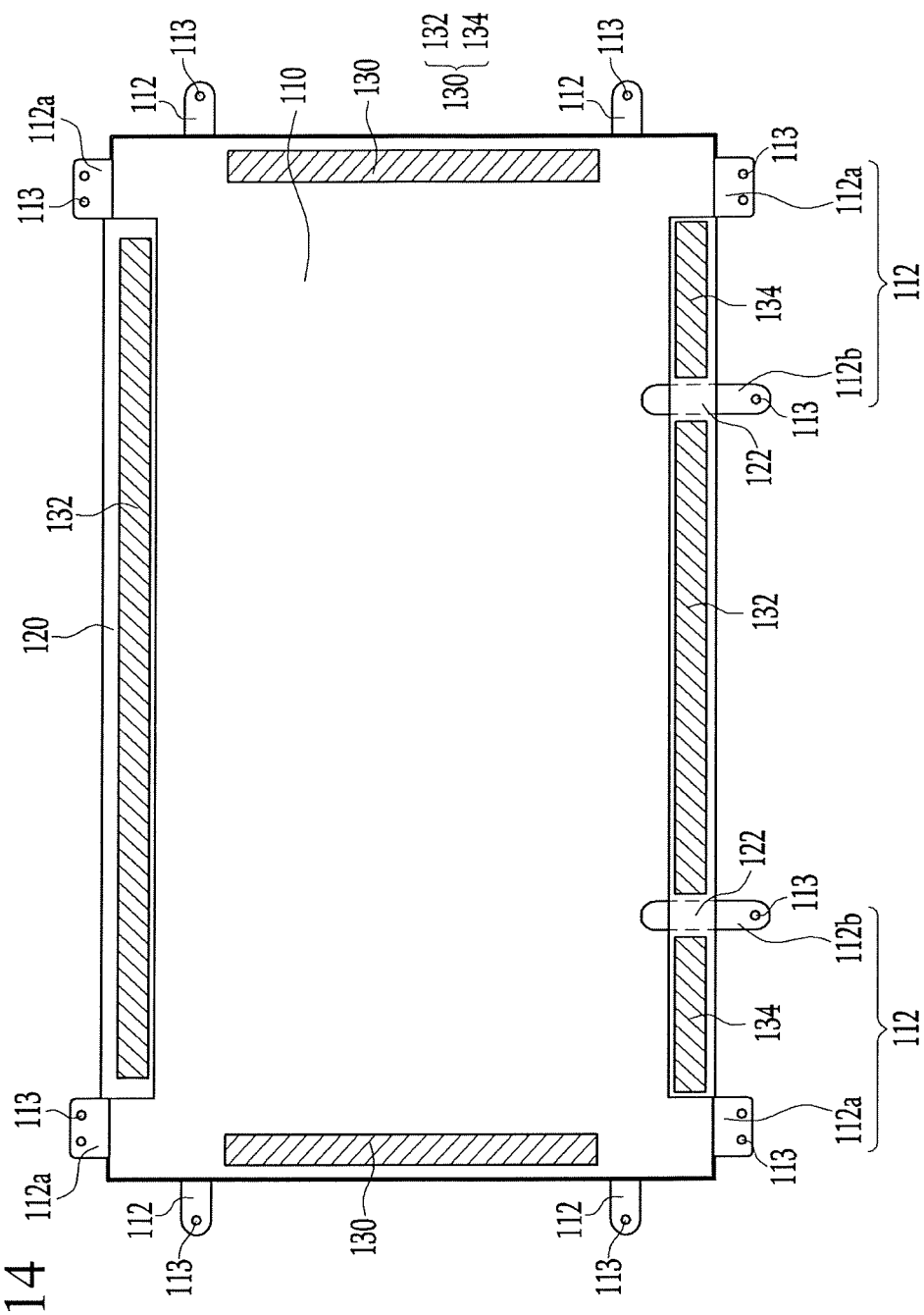
FIG. 14 is a top plan view illustrating a double-sided adhesive tape attached to a supporting frame of the display device of FIG. 11, according to an exemplary embodiment of the present invention.

FIG. 11 is a top plan view illustrating a double-sided adhesive tape attached to a supporting frame of a display device, according to an exemplary embodiment of the present invention. FIG. 12 is a top plan view illustrating a double-sided adhesive tape attached to a supporting frame of the display device of FIG. 11, according to an exemplary embodiment of the present invention. FIG. 13 is a top plan view illustrating a double-sided adhesive tape attached to a supporting frame of the display device of FIG. 11, according to an exemplary embodiment of the present invention. FIG. 14 is a top plan view illustrating a double-sided adhesive tape 130 attached to a supporting frame 120 of the display device 100 of FIG. 11, according to an exemplary embodiment of the present invention.

FIG. 11 to FIG. 14 schematically illustrates a portion of a display device 100 including a bottom chassis 110 having flanges 112. The flanges 112 may be formed on a pair of lateral sides of the bottom chassis 110.

As illustrated in FIG. 11 to FIG. 14, according to an exemplary embodiment of the present invention, the bottom chassis 110 may include the flanges 112 formed in the pair of lateral sides. Each of the flanges 112 may be formed in the lateral sides in pairs, but the present invention is not limited thereto. The number and/or locations of the flanges 112 disposed on each of the lateral sides may be set as needed.

The flanges 112 on the lateral sides may be formed by bending a part of the bottom surface 114 of the bottom chassis 110 or by bending a part of the side surface 116. In addition, the flanges 112 may be formed separately and may be welded, or otherwise fixed to the bottom chassis 110.

According to an exemplary embodiment of the present invention, with reference to FIG. 11 to FIG. 14, the double-sided adhesive tape 130 is also attached to a part of the support frame 120 in an area not overlapping with the overlap portion 122. As a result, the flanges 112 are not overlapped with the double-sided adhesive tape 130, and the double-sided adhesive tape 130 is attached only to a portion of the supporting frame 120 disposed between the flanges 112. For example, the double-sided adhesive tape 130 may be attached along any portion of the support frame 120 which does not overlap the flanges 112 and/or any portion of the bottom chassis 110 (e.g., along the edges of the bottom chassis 110) which does not overlap the flanges 112.

Therefore, by attaching the double-sided adhesive tape 130 to the portions of the support frame 120 which do not overlap the flanges 112 and/or areas near the edges of the bottom chassis 110 which do not overlap the flanges 112, damage to the display panel 140 may be prevented and/or the light leakage phenomenon may be prevented from occurring in the display panel 140 due to the unevenness of the bottom chassis 110 at/around the flanges 112.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. A display device, comprising:
  a bottom chassis;
  a flange protruding from an edge of the bottom chassis;
  a supporting frame disposed along a portion of the edge of the bottom chassis;
  a double-sided adhesive tape having a first adhesive side and a second adhesive side opposite to the first adhesive side, wherein the first adhesive side is adhered to the supporting frame;
  a display panel disposed on the bottom chassis and adhered to the second adhesive side of the double-sided adhesive tape; and
  a light source unit configured to provide light to the display panel,
  wherein the double-sided adhesive tape is adhered to a first portion of the supporting frame and the double-sided adhesive tape is absent from a second portion of the supporting frame, wherein the second portion of the supporting frame is disposed alongside the flange.

2. The display device of claim 1, wherein the bottom chassis has a plurality of sides,
wherein a first side of the plurality of sides of the bottom chassis includes a plurality of flanges,
wherein the supporting frame supports the first side of the bottom chassis, and
wherein the double-sided adhesive tape has a gap at each location of the supporting frame that is disposed alongside a flange of the plurality of flanges.

3. The display device of claim 2, wherein the bottom chassis has a polygonal first surface and a plurality of side surfaces that extends in a direction perpendicular to the first surface, and
the plurality of flanges includes a first flange formed by bending a part of a first side surface of the plurality of side surfaces.

4. The display device of claim 3, wherein the first side surface further includes a pair of first flanges, and
the double-sided adhesive tape includes a first attachment portion adhered to a first sub-portion of the first portion of the supporting frame, wherein the first sub-portion is disposed between the pair of first flanges.

5. The display device of claim 3, wherein the plurality of flanges further includes a second flange formed by bending a portion of the first surface.

6. The display device of claim 5, wherein the double-sided adhesive tape further includes a second attachment portion disposed between a flange of the pair of first flanges and the second flange.

7. The display device of claim 6, further including a pair of second attachment portions, wherein the first surface includes a pair of second flanges,
wherein the pair of first flanges is disposed between the pair of second flanges, and
wherein one of the pair of second attachment portions is disposed between one of the pair of second flanges and the pair of first flanges, and the other of the pair of second attachment portions is disposed between the other of the pair of second flanges and the pair of first flanges.

8. The display device of claim 2, wherein at least one flange of the plurality of flanges is welded to the bottom chassis.

9. The display device of claim 8, wherein the double-sided adhesive tape is adhered to the supporting frame at regions of the supporting frame that are disposed between pairs of flanges of the plurality of flanges.

10. The display device of claim 1, further comprising a plurality of optical sheets and a light guide plate, wherein the light guide plate is disposed between the bottom chassis and the display panel.

11. The display device of claim 1, wherein the flange has a through-hole, wherein the through-hole extends in a direction substantially perpendicular to a surface of the bottom chassis.

12. The display device of claim 1, wherein the bottom chassis includes a metal or a polymer.

13. The display device of claim 1, wherein the supporting frame includes a polymer.

14. The display device of claim 1, wherein the bottom chassis and the supporting frame are parts of a same structure.

15. A display device, comprising:
a bottom chassis including a plurality of flanges, wherein the plurality of flanges extend away from an edge of the bottom chassis;
a supporting frame disposed along at least a portion of the edge of the bottom chassis to support the bottom chassis;
a double-sided adhesive tape attached to a first portion of the supporting frame, wherein the first portion of the supporting frame extends along the supporting frame, and the first portion of the supporting frame omits areas of the supporting frame that are located alongside each flange of the plurality of flanges;
a display panel adhered to the supporting frame by using the double-sided adhesive tape; and
a light source unit configured to provide light to the display panel.

16. A display device, comprising:
a bottom chassis having a first area, wherein the first area has a first edge,
a first flange protruding from the first edge;
a supporting frame coupled to the first edge of the bottom chassis, wherein the supporting frame extends along the first edge, and wherein the first flange extends alongside a first area of the supporting frame;
a display panel configured to display an image, wherein the display panel is disposed on the first area;
a double-sided adhesive tape disposed between the display panel and the supporting frame, wherein the double-sided adhesive tape adheres the display panel to the supporting frame; and
a light source unit configured to provide light to the display panel,
wherein the double-sided adhesive tape is disposed at a second area the supporting frame,
wherein the second area of the supporting frame excludes the first area of the supporting frame.

17. The display device of claim 16, wherein the first flange is cut from material located in the first area of the bottom chassis.

18. The display device of claim 16, wherein the first flange is welded to the first edge.

19. The display device of claim 16, further comprising a second flange protruding from the first edge, wherein the first and second flanges are spaced apart from each other,
wherein the second flange extends alongside the supporting frame at a third area of the supporting frame, and
wherein the second area of the supporting frame is disposed between the first and second areas of the supporting frame.

20. The display device of claim 16, wherein the second area is substantially flat and the first area is wavy, bent or jagged.

* * * * *